United States Patent [19]
Gradeff et al.
[11] Patent Number: 4,889,771
[45] Date of Patent: Dec. 26, 1989

[54] METHOD OF PRESERVING WOOD WITH LANTHANIDE DERIVATIVES

[75] Inventors: Peter S. Gradeff, Pottersville; John F. Davison, Edison, both of N.J.

[73] Assignee: Rhone-Poulénc Inc., Princeton, N.J.

[21] Appl. No.: 121,623

[22] Filed: Nov. 17, 1987

Related U.S. Application Data

[63] Continuation-in-part of Ser. No. 17,159, Feb. 20, 1987, Pat. No. 4,743,473.

[51] Int. Cl.[4] .......................... B05D 1/18; C09D 5/14
[52] U.S. Cl. ................................. 428/541; 106/15.03; 106/286.1; 252/397; 427/440
[58] Field of Search .......................... 106/15.05, 286.1; 252/397; 427/297, 440; 428/541

[56] References Cited

U.S. PATENT DOCUMENTS

| | | | |
|---|---|---|---|
| 2,565,175 | 8/1951 | Hager | 167/38.5 |
| 3,080,212 | 3/1963 | Oberley et al. | 21/7 |
| 4,287,239 | 9/1981 | Hager | 427/351 |
| 4,303,705 | 12/1981 | Kelso | 427/351 |
| 4,325,993 | 4/1982 | Schroder | 427/315 |
| 4,335,109 | 6/1982 | Hill | 427/440 X |
| 4,466,998 | 8/1984 | McIntyre et al. | 427/297 |
| 4,532,161 | 7/1985 | Collins et al. | 427/440 |
| 4,567,115 | 1/1986 | Trumble | 428/541 |
| 4,743,473 | 5/1988 | Gradeff et al. | 427/440 X |

*Primary Examiner*—Michael Lusignan
*Attorney, Agent, or Firm*—Morgan & Finnegan

[57] ABSTRACT

Described is a method of treating wood without pressure using compositions comprising aqueous solutions of one or more lanthanide derivative. Also described is a composition comprising wood and lanthanides or lanthanide derivatives.

16 Claims, No Drawings

METHOD OF PRESERVING WOOD WITH LANTHANIDE DERIVATIVES

CROSS REFERENCE

This application is a continuation-in-part of U.S, Ser. No.: 017,159, filed Feb. 20, 1987, now U.S. Pat. No. 4,743,473, patented May 10, 1988.

FIELD OF THE INVENTION

The invention relates to a method of preserving wood with lanthanide derivatives.

BACKGROUND OF THE INVENTION

Wood preservatives known in the art are either oil-bases or water-based. Oil-based preservatives fall into two main classes, namely (i) coal tar creosote and solutions of creosote with coal tar or petroleum oils and (ii) solutions of preservative chemicals, such as pentachlorophenol dissolved in a suitable organic carrier.

One disadvantage of oil based preservatives is that they exude from the wood. Thereafter they may wash from the surface or evaporate. In order to compensate for the loss of the oil-based preservative, high initial retentions are required. In tropical and high rainfall areas, the use of oil-based preservatives has been found to be uneconomical. Another disadvantage of certain oil-based preservatives is that they are regarded as a skin irritants and can cause burns. Furthermore, oil-based preservatives such as creosote cannot be painted and do not have attractive appearances. These preservatives often have toxic side effects.

Water based preservatives are those containing chemical preservatives in the form of aqueous solutions. Such preservatives react within the wood to form compounds, the solubility of which may be increased by adjustment of pH. When chemical changes occur within the wood resulting in compounds with very low solubility, the compounds are designated as leach-resistant. Those which form soluble compounds are designated as leachable.

Leach-resistant water-based preservatives in commercial use include acid copper chromate solution (ACC), chromated copper arsenate solution (CCA) and ammoniacal copper arsenate solution (ACA). CCA solutions are commonly used. They form, in the wood, compounds which are toxic to both fungi and insects. Leachable water-based preservatives include chromated zinc chloride and fluoride-chromium-arsenate-phenol mixtures and boron compounds. The leachable water-based preservatives can only be used in treating timber to be used internally or where leaching conditions are not severe.

Use of water-based preservatives has many advantages: cleanliness, paintability of the treated wood, freedom from odor, and when correctly applied, longer protection of the wood.

The American Wood-Preserver's Association "Book of Standards" (1986) defines and describes on pages 1978 and 1979 well known technique for applying wood preservative compositions. Among these are mentioned:

Brushing
Butting
Diffusion
Dipping
Double Pressure
Dual
Empty-Cell
End Pressure
Full-Cell
Internal
Non-Pressure
Pressure
Spray
Surface
Thermal
Vacuum These methods achieve the desired result of applying compositions having wood preservation properties to wood. The descriptions of wood preservation methods described on these pages and throughout the Book of Standards are hereby incorporated by reference.

Essential features of the pressure method are that (1) the wood is surrounded by a preservative solution in a closed vessel; and (2) hydrostatic pressure is applied by mechanical means to force the solution into the wood fibers by replacing air or water already there, or going into any voids. It is conventional to evacuate the system to about 26" of mercury vacuum to remove air from cells within the wood. When a solution of CCA is used to impregnate wood, the CCA reacts inside the wood with reducing sugars found therein to form a mixture of insoluble salts.

U.S. Pat. No. 2,565,175 to Häger describes a method of preserving wood using specific types of preservatives in combination with specific methods and conditions of penetration and distribution of these preservatives within the wood. One specific type of preservative is CCA, to which ammonia is added to render the preservative solution alkaline. The ammonia addition prevents rapid fixation of the preservative in the wood. According to the method described by Häger, the preservative is introduced into the wood and the wood is kept in an undried condition for a period of time during which no fixation of the preservative occurs, and the preservative diffuses through the cell walls. Thereafter, the wood is dried.

U.S. Pat. No. 4,303,705 to Kelso, Jr. describes a process for preserving wood against attack by living organisms, e.g., fungi and insects. The process may comprise one or two steps. In the two step process, there is a fungicidal step comprising introducing a copper solution into wood, and an insecticidal step comprising introducing a chromium and arsenic solution into wood.

One disadvantage of using CCA is that not all fixation of the preservative takes place in the wood. Sludging may occur in the working solution due to pickup of wood or wood extractives, corrosion, or impurities in the chemicals used to make up the solution. Sludging causes a deposit of solids on the surface of the wood. These deposits contain varying percentages of arsenic and thus are a matter of environmental concern. Recent treatment standards (AWPA 1982) have recognized this (see Hartford, W., "The Practical Chemistry of CCA is Service", American Wood Preservers' Association Annual Meeting, Apr. 28, 29 and 30, 1986, pp. 1-16).

Lanthanide derivatives are used in glass, ceramic, paint, plastics, and rubber manufacture. Compositions comprising cerium compounds are known to have bacteriocidal effects, e.g. compositions comprising cerium nitrate and silver sulfadiazine (Boeckx, et al., Burns vol. 11, no. 5 (1985) pp. 337-342; Monafo, *3rd International Congress on Pharmacological Treatment of Burns,* Milan, Italy, May 12-15 1980, *Panmainerva Med.,* vol. 25, No.

3 (1983) pp. 151–154; Bowser, et al., *J. Trauma*, vol. 21, No. 7 (1981) pp. 558–563; Monafo, et al., *Arch. Surg.* vol. 113, No. 4 (1978) pp. 397-401; Monafo, et al Surgery (St. Louis) vol. 80, No. 4 (1976) pp. 465–473), and compositions containing electrically activated silver and cerium stearate (Colmano, et al., *23rd Annual Meeting of the Biophysical Society* (New York), Atlanta Ga., Feb. 26–28, 1979, *Biophys. J.* vol. 25, No. 2, part 2 (1979) p. 217A). Cerium derivatives are also used as additives in plastics for food packaging.

It is an object of the present invention to provide a new safe method for treating wood with compositions comprising water soluble lanthanide derivatives. It is a further object of the invention to achieve permanent bonding of lanthanide ions to wood fibers. It is a further object of the present invention to promote flame retardation and to inhibit wood deterioration resulting from exposure to wood-destroying organisms such as bacteria, insects, and fungi, or to atmospheric conditions. These and other objects are met by the present invention and are further described in the specification.

SUMMARY OF THE INVENTION

The invention is directed to a method for treatment of wood by impregnation with compositions comprising aqueous solutions of one or more lanthanide derivatives. Wood is impregnated by one or a combination of the several known techniques chosen so as to accomplish the desired degree of penetration for the purpose of the intended use. This might include pressure treatment, vacuum treatement, surface treatment that includes dipping and spraying, brushing, full cell treatment and other modes of treatement as known in the art.

The invention is also directed to a method of treating wood without pressure using compositions comprising aqueous solutions of one or more lanthanide derivatives.

The invention is also directed to a method of treating wood with compositions comprising aqueous solutions of one or more lanthanide derivatives whereby the composition is contacted with the wood under vacuum.

The invention is also directed to a composition comprising wood and lanthanides or lanthanide derivatives. This composition is resistant to deterioration that occurs to lanthanide-free wood exposed to wood-destroying organisms such as bacteria, insects, and fungi, as well environmental conditions that promote decay.

DETAILED DESCRIPTION OF THE INVENTION

According to the methods of this invention, wood is impregnated with an aqueous solution containing one or more lanthanide derivatives. Preservation treatement of wood is applied to varity of forms or types of wood: Lumber, timber, bridge and wire ties, fence posts, plywood, floor blocks and platforms, wood for commerical - residential construction, marine construction, structural lumber, laminated material fibers and pulp, cooling towers, wood used for harvesting storage and transportation of food stuffs. The term wood used here, comprises but is not limited to all these.

Suitable lanthanide derivatives include the lanthanides elements such as lanthanum, cerium, praseodymium, neodymium, samarium, europium, gadolinium, terbium, dysprosium, holmium, erbium, thulium, ytterbium and lutetium. Cerium can be trivalent or tetravelent.

The lanthanide cation can be bonded to an inorganic anion such as nitrate, chloride, sulfate, perchlorate, phosphate, or phosphonate. The lanthanide cation can also be bonded to an organic ligand such as lower alkyl carboxylate, e.g. acetate, propionate, acrylate, methacrylate, gluconate, lactate, alkyl sulfonate or alkyl phosphonate. Derivatives having both inorganic and organic ligands are also suitable in the present invention.

The lanthanide derivatives may be used alone or in admixture with other wood treatment agents such as flame retardants, coloring agents, anti-checking agents, anti-static agents, dimensional stabilizers, film-forms, wood softening agents, and other biocides or fungicides.

The lanthanide derivatives must be soluble in water, preferably in an amount at least about 0.1% by weight. Use of concentrations less than 0.1% by weight is not economical. Concentrations about 0.1% to about 10% are preferred, although higher concentrations can be used. Concentrations about 0.5% to abut 2.5% are more preferred.

It is believed that the interaction that takes place between the lanthanide ion and the wood according to the method of the invention is a crosslinking of cellulose fibers with the lanthanide ion. It is also believed that the lanthanide element becomes linked to other components of the wood such as lignin and rosin that offer active sites for chemical bonding. Linkage could involve one or all of the valencies of the lanthanide element. Crosslinking takes place under approximately neutral or low range pH (less than about 7.0). The interaction is faster under hydrostatic pressure or vacuum method treatment, and slower under surface treatment process. Compositions are applied so that the lanthanide cation penetrates the wood fibers, and reacts with hydroxy or other active sites of the wood.

The time necessary to achieve a sufficient amount of permanent bonding of the lanthanide to the wood depends on several factors, e.g. type of treatment and type of wood material to treat as well as the condition of the material prior to the treatment.

Any suitable method to apply lanthanide derivative to the wood material can be used. Several methods are practiced and recognized by the American Wood Preservative Association. They are defined below:

| | |
|---|---|
| Brush | Application of one or more coats of liquid preservative to the surface of timber with a brush. |
| Butt | Preservative treatment applied to the lower, or butt end of posts and poles; usually by the Thermal Process. |
| Pressure | The impregnation of wood with a liquid by application of pressure above atmospheric or above any initial air pressure may have been applied. |
| Diffusion | A treatment in which green wood or water-soaked wood is immersed in an aqueous solution or has applied to it a paste or solid containing water-soluble chemicals, to permit the chemicals to diffuse into the water in the wood. |
| Dip | Application of a liquid preservative to a wood by immersing the wood in the liquid for a short period of time. |
| Dual | Treatment of wood to be used under severe conditions of exposure with two dissimilar synergistic preservatives in two separate treating cycles, e.g. treatment of marine piles and timbers |

-continued

| | |
|---|---|
| | for areas of extreme borer hazard. Usually, the first treatment is with a water-borne salt preservative; and the second with creosote or creosote-coal tar solution. |
| Empty-cell | A treatment in which air imprisoned in the wood is employed to force out part of the preservative when treating pressure is released and a final vacuum is applied. |
| Internal | A treatment applied by injecting into a pole or timber, through holes bored for the purpose, sufficient preservative material to protect against deterioration from wood-destroying organisms. |
| Non-pressure | A process for treating wood which does not require the use of hydraulic pressure. |
| Spray | Application of one or more coats of a liquid preservative to the surface of wood with a spraying device. |
| Surface | Superficial application of a liquid preservative to wood by brushing, spraying, or dipping. |
| Thermal | A process of impregnating wood by (a) submerging it in hot preservative or fluid for various lengths of time, and then (b) in preservative at a lower temperature, with resulting reduction of pressure within the wood and forcing of the preservative into the wood by atmospheric pressure. |
| Vacuum | Application of treating liquids to wood in a closed vessel by evacuating or partially removing the air from the vessel and introducing the liquid without re-admitting air. |
| Full-Cell | A treatment involving a preliminary vacuum followed by pressure impregnation such that the cell cavaties in the treated portion of the wood remain partially or completely filled with preservative. |

Within the scope of the invention are methods of conditioning of the wood which involve preliminary steps aimed to enhance penetration of the lanthanide compositions into the wood. These steps include: air-seasoning, kiln drying, vacuum drying, steaming or a combination of these.

Methods of treatment such as Surface Treatment for instance by dipping, spraying or brushing are self explanatory. The treatment can be single or repeated, in combination with other agents or in alternate fashion involving different concentrations of treating solutions, all depending on the extend of the penetration desired. Treatement can be done at about room temperature or higher.

The inventors the generally accepted term "penetration" is not sufficient to describe and explain the unexpected and superior results of wood treated with lanthanide products. The present invention provides permanent fixation of the elements to the wood. By permanent fixation, called also bonding or cross-linking in the application, it is meant that the lanthanide metal is fixed to the fibers in such a manner that it is no longer leachable with water. As noted in our co-pending application U.S. Ser. No. 017,159 concerning wood treated with lanthanides under pressure, treated wood shows greater amounts of bonded metal after aging than when tested soon after the treatment. Wood well impregnated at atmospheric pressure and leached soon after, show some, but rather small amounts of bonded metal. It has been confirmed now that when sufficient time is allowed, the lanthanides that have "penetrated" or "impregnated" the wood will gradually become permanently bonded to the wood if the material is not exposed to conditions where leaching will occur prior to the bonding. The premature leaching can be prevented by simply protecting the material from exposure to excessive running water or by sealing the surface of the treated wood by any available means. It is believed that the amount of lanthanide metal (expressed in % of oxide) permanently bonded to the wood should be at least 0.1% of the total weight in order to provide the preservative effect. Higher amounts, as much as the wood could take, are of course preferable for use under extreme conditions.

The mechanism of preservation of wood treated with lanthanides is not well understood. It appears that it is different from what is believed to be the mechanism of action of any of the currently used preservatives, as lanthanides are not generally considered being toxicants.

Vacuum application can be seen as two step treatment. First, subjecting the wood under vacuum, then introducing the treating solution without re-admitting air. It is obvious that the parameters of this method can be varied to a considerable extend. Seasoned, or preconditioned wood will require less time and vacuum than wet wood. The time as well as the vacuum will also depend on the size or shape of the material to be treated and the depth of penetration desired. The same goes for the temperature. The purpose of the vacuum step is to empty wood cells from humidity and air so that the treating lanthanide containing solution could burst into the empty cell under lesser resistance. The effect is similar to the one of treating the wood under pressure, and so are the results. Although pressure treatment is more common than vacuum treatment, the American Wood Preservation Association has adopted the vacuum method as a standard method for applying wood preservatives.

Pressure Treatment can be used to treat to previously conditioned wood or if suitable to the wood or wood fiber as is. It consists of applying hydrostatic pressure to wood material submerged into the treating lanthanide productcontaining solution. The time can vary widely depending on the condition of the wood, the type as well as its thickness. Normally from about 0.5 to about 10 hours are sufficient. Of course longer periods may be used. Contact time may be decreased with increased pressure. Preferred contact time is from about 3 to about 6 hours. Evidence shows that while most of the bonding occurs during immersion of wood in the lanthanide solution, the bonding reaction may continue for several days after the treatment.

Preferably, pressure is between about 10 psi and about 300 psi, more preferably about 50 psi to about 280 psi. The pressure can be maintained using one or more inert gases, e.g. nitrogen gas, or by applying the composition under pressure generated by a pump.

Treatment temperature should not exceed about 95° C. Preferably, temperatures are about ambient, i.e. 20° C.-30° C. For some treatments, temperature of about 40°-60° C. is preferred to assist penetration and bonding of lanthanide to the wood fibers.

After treatment, the aqueous solution is drained. The amount of lanthanide derivatives can be adjusted and the resulting solution used to treat another load of wood. Treated wood is simply left to air dry. The treated wood is resistant to decay caused by exposure to bacteria, insects, fungi and atmospheric conditions. Furthermore, the treatment promotes flame retardation. One of the great advantages to using lanthanides is their relative safety which is important during processing, disposing, or subsequent leaching or sludging as they normally occur.

The following examples describe particular embodiments of the invention. The examples are for illustration only and should not be interpreted as limiting the scope of the invention.

EXAMPLE 1

Pressure Treatment

A series of pressure treatment tests was run whereby Southern yellow pine was treated with lanthanide derivatives using a procedure known in the art for treating Southern yellows pine with CCA. Small blocks of untreated kiln dried pine were placed in a pressure apparatus. Aqueous compositions containing lanthanide derivatives were added to the apparatus in am amount sufficient to immerse the wood. Pressure was maintained using nitrogen gas. After treatment was completed, the samples were taken out and left to drain and air-dry. In order to determine the amount of metal permanently bonded to the wood, a sample of treated wood was water washed for 12 hours in running water. The washed wood was then assayed for the percentage of "ash" measured after burning and calcining the residue of the sample. The percentage "ash" of wood prior to treatment was subtracted from the percentage "ash" of treated wood to measure the amount of permanently bonded metal.

Wood deterioration studies of pine wood treated with lanthanide derivatives, indicate that beneficial effect is already manifested at the level of about 0.25% ash due to bonded lanthanide. The sample is shown to be effectively protected from decay and degradation from attack by microorganism, fungi and insects.

Results are shown in Table I. All treatments, unless otherwise indicated, were at room temperature. Untreated pine used for tests 1-18 contained about 0.08% ash. Untreated pine used for all other tests contained about 0.12% ash. A commercial sample of Southern yellow pine treated with CCA was measured for percentage "ash" as a control.

TABLE I

| Test # | Preservation compound of the test composition | Treatment | % Ash | Days prior to washing |
|---|---|---|---|---|
| Control | CCA | Commercial sample | 0.94 1.21 | Commercial sample |
| 1 | $Ce(NO_3)_3$ (1%, pH 5.1) | 3 hrs. 240 psi | 0.52 | —* |
| 2 | $Ce(NO_3)_3$ (1%, pH 5.1) | 5-½ hrs. 230 psi | 0.71 | — |
| 3 | $Ce(NO_3)_3$ (1%, pH 5.1) | 5-½ hrs. 230 psi | 1.0 | 14 |
| 4 | $Ce(NO_3)_3$ (1%, pH 5.1) | 3 hrs. 180 psi, 50° C. | 0.90 | 7 |
| 5 | $Ce(NO_3)_3$ (1%, pH 5.1) | 6 days, atm. | 0.18 | — |
| 6 | $Ce(NO_3)_4$ (1%, pH 4.5) | 5-½ hrs. 230 psi | 0.57 | |
| 7 | $Ce(NO_3)_4$ (1%, pH 4.5) | 5-½ hrs. 230 psi | 0.58 | 7 |
| 8 | $Ce(NO_3)_4$ (1%, pH 4.5) | 5-½ hrs. 230 psi | 0.66 | — |
| 9 | $Ce(NO_3)_4$ (2%, pH 4.7) | 3 hrs. 230 psi | 0.60 | — |

TABLE I-continued

| Test # | Preservation compound of the test composition | Treatment | % Ash | Days prior to washing |
|---|---|---|---|---|
| 10 | $Ce(NO_3)_4$, $2NH_4$ (1%, pH 6.0) | 5-½ hrs. 230 psi | 1.35 | — |
| 11 | $Ce(NO_3)_4$, $2NH_4$ (1%, pH 6.0) | 5-½ hrs. 230 psi | 1.15 | 4 |
| 12 | $Ce(NO_3)_4$, $2NH_4$ (1%, pH 6.0) | 5-½ hrs. 230 psi | 0.94 | — |
| 13 | $Ce(NO_3)_4$, $2NH_4$ (1%, pH 6.0) | 6 days, atm. | 0.185 | — |
| 14 | Cerous methacrylate (1%) | 5-½ hrs. 230 psi | 0.55 | — |
| 15 | Cerous methacrylate (1%) | 5-½ hrs. 240 psi | 0.61 | 20 |
| 16 | Cerous methacrylate (1%) | 6 days, atm. | 0.28 | — |
| 17 | Cerous lactate (1%, pH 6.0) | 5-½ hrs. 260 psi | 0.73 | — |
| 18 | Cerous lactate (1%, pH 6.0) | 5-½ hrs. 260 psi | 1.16 | 8 |
| 19 | Cerous lactate (1%, pH 6.0) | 6 days, atm. | 0.15 | — |
| 20 | $La(NO_3)_3$(1%, pH 3.3) | 5-½ hrs. 220 psi | 0.21 | — |
| 21 | $La(NO_3)_3$(1%, pH 3.3) | 5-½ hrs. 220 psi | 0.51 | 6 |
| 22 | $La(NO_3)_3$(1%, pH 3.3) | 6 days, atm. | 0.32 | — |
| 23 | Lanthanide mix $(NO_3)_3$** (1%, pH 3.0) | 5-½ hrs. 220 psi | 0.51 | — |
| 24 | Lanthanide mix $(NO_3)$**$_3$ (1%, pH 3.0) | 5-½ hrs. 220 psi | 1.06 | 6 |
| 25 | Lanthanide mix $(NO_3)_3$** (1%, pH 3.0) | 6 days, atm. | 0.21 | — |
| 26 | Cerous acetate (1%, pH 4.3) | 5-½ hrs. 220 psi | 0.75 | — |
| 27 | Cerous acetate (1%, pH 4.3) | 5-½ hrs. 220 psi | 1.50 | 5 |
| 28 | Cerous acetate (1%, pH 4.3) | 6 days, atm. | 0.044 | — |
| 29 | Cerous propionate (1% aq. pH 7.3) | 5-½ hrs. 220 psi | 0.71 | — |
| 30 | Cerous propionate (1% aq. pH 7.3) | 5-½ hrs. 220 psi | 1.53 | 5 |
| 31 | $Ce(NO_3)_4$ $2NH_4$ (2%, pH 5.0) | 10 hrs, 50 psi | 0.49 | — |
| 32 | $Ce(NO_3)_4$ $2NH_4$ (0.5%, pH 5.0) | 1 hr., 60° C. 220 psi | 0.70 | — |
| 33 | $Ce(NO_3)_4$ $2NH_4$ (15.0%, pH 4.2) | 5-½ hrs. 220 psi | 1.30 | 7 |
| 34 | $Ce(NO_3)_4$ $2NH_4$ (15.0%, pH 4.2) | 5-½ hrs. 10 psi | 0.50 | 10 |
| 35 | Cerous Toluene Sulfonate (1.0%, pH 5.0) | 4 hrs. 250 psi | 0.95 | — |
| 36 | $Ce(SO_4)_2$ (1.0%, pH 2.0) | 5 hrs. 200 psi | 1.0 | 2 |

*"-" indicates washing was done immediately after wood was removed from the lanthanide composition.
**Mixture of $Ce(NO_3)_3$, $La(NO_3)_3$, $Pr(NO_3)_3$ and $Nd(NO_3)_3$.

Table II illustrates the advantage of aging.

TABLE II

| Compound | % ash (days prior to washing) | % ash (immediate wash) |
|---|---|---|
| Cerous acetate | 1.5 (5) | 0.75 |
| Cerous propionate | 1.5 (5) | 0.71 |
| Cerous lactate | 1.16 (8) | 0.73 |
| $Ce(NO_3)_6$ $2NH_4$ | 1.15 (4) | 1.35 |
| Lanthanide mix $(NO_3)_3$ | 1.06 (6) | 0.51 |
| Cerous $(NO_3)_3$ | 1.00 (14) | 0.71 |

TABLE II-continued

| Compound | % ash (days prior to washing) | % ash (immediate wash) |
|---|---|---|
| Cerous methacrylate | 0.61 (20) | 0.55 |
| La $(NO_3)_3$ | 0.51 (6) | 0.21 |

EXAMPLE 2

Surface Treatment

Southern yellow pine wood is treated with lanthanide derivatives by dipping into, or spraying with or brushing with a composition comprising an aqueous solution of lanthanide derivative onto the surface of the wood. The treated wood is allowed to dry and age for several days.

In order to determine the extend of permanent bonding samples are leached with running water as described in Example 1 and then burned to ashes. When leaching is done right after treatment, the results show that a certain amount of lanthanide metal is permanently bonded. (See Example 1, Tests 5,13,16,19,22,25). When leaching is done subsequent to an aging period of several days or months after treatment, higher amounts of bonded lanthanide are found.

EXAMPLE 3

Vacuum Treatment

Without prior conditioning, standard test size blocks were placed in an empty, two neck reaction flask equipped with a dropping funnel containing 2% cerium nitrate aqueous solution. The flask was hooked up to a vacuum (of about 2 mmHg) and the vacuum maintained for 10 hours. The flask was flooded with the cerium nitrate solution and the blocks kept immersed for about 4 hours. After draining and air drying for 10 hours, a sample was leached over night, then ashed.

| Control: | |
|---|---|
| Ash in untreated sample | 0.07% |
| Ash in treated sample after leaching | 1.33% |

The results shown that permanently bonded cerium (as $CeO_2$) is 1.24%

What is claimed is:

1. A method of preserving wood comprising the steps of (a) contacting the wood with a composition comprising an aqueous solution of one or more lanthanide derivatives to impregnate wood with the lanthanide derivative;

(b) letting the wood-solution complex air-dry; and (c) aging the wood-solution complex for a period of time sufficient to bond the lanthanide element to the wood.

2. A method according to claim 1, wherein the lanthanide is cerium.

3. A method according to claim 1, wherein the lanthanide is lanthanum.

4. A method according to claim 1, wherein the lanthanide is praseodimium

5. A method according to claim 1, wherein the composition comprises a mixture of various lanthanide derivatives.

6. A method according to claim 1, wherein the composition comprises a mixture of derivatives of various lanthanides.

7. A method according to claim 1, wherein the composition comprises one or more cerium compounds selected from the group consisting of $Ce(NO_3)_3$, $Ce(NO_3)_4$, $CeCl_3$, $Ce_2(SO_4)_3$, $Ce(SO_4)_2$, $Ce(NO_3)_6 \cdot 2NH_4$, cerous acetate, cerous methacrylate, cerous lactate, cerous propionate, and cerous toluene sulfonate.

8. A method according to claim 1, wherein the composition comprises $La(NO_3)_3$.

9. A method according to claim 1, wherein the composition comprises $Pr(NO)_3$.

10. A method according to claim 1, wherein the composition comprises a mixture of lanthanide nitrates.

11. A method according to claim 1, wherein the composition comprises a mixture of lanthanide derivatives.

12. A method according to claim 1, wherein the aqueous solution comprises about 0.1% to about 10% by weight of one or more lanthanide derivatives.

13. A method according to claim 1, wherein the contacting step is preceded by a preliminary conditioning step which enhances penetration of the solution contacted with the wood.

14. A composition comprising wood or wood derivatives treated with effective amounts of lanthanides or lanthanide derivatives.

15. A composition of claim 14 wherein the lanthanide or lanthanide derivative comprises between about 0.1% to about 5.0% of the weight of the composition expressed as oxide of the lanthanide element.

16. A composition of claim 14 wherein the lanthanide or lanthanide derivative comprises by weight between about 0.10% and about 2.0% of the composition.

* * * * *